United States Patent
Fukagawa et al.

[19]

[11] Patent Number: 5,997,040
[45] Date of Patent: Dec. 7, 1999

[54] FUEL CYLINDER MOUNTING STRUCTURE IN MOTORCAR

[75] Inventors: Masami Fukagawa; Masayuki Sano; Toshiaki Hitomi; Yutaka Kanaguchi, all of Wako, Japan

[73] Assignee: Honda Giken Kogyo Kabushiki Kaisha, Tokyo, Japan

[21] Appl. No.: 08/841,527

[22] Filed: Apr. 23, 1997

[30] Foreign Application Priority Data

| Apr. 26, 1996 | [JP] | Japan | ..... 8-108215 |
| Apr. 26, 1996 | [JP] | Japan | ..... 8-108216 |
| Apr. 26, 1996 | [JP] | Japan | ..... 8-108217 |

[51] Int. Cl.$^6$ .............. B60B 3/22; B60K 15/10
[52] U.S. Cl. .......................... 280/834; 180/69.5
[58] Field of Search ................... 280/830, 831, 280/832, 834; 180/69.5

[56] References Cited

U.S. PATENT DOCUMENTS

| 3,633,609 | 1/1972 | Benner et al. | .............. 280/834 |
| 5,195,780 | 3/1993 | Inoue et al. | .............. 280/834 |
| 5,518,272 | 5/1996 | Fukagawa et al. | .............. 280/834 |
| 5,794,979 | 8/1998 | Kasuga et al. | .............. 280/834 |

FOREIGN PATENT DOCUMENTS

7-186741  7/1995  Japan .

*Primary Examiner*—Lanna Mai
*Assistant Examiner*—Jeff Restifo
*Attorney, Agent, or Firm*—Armstrong, Westerman, Hattori, McLeland & Naughton

[57] ABSTRACT

A fuel cylinder for storing a compressed fuel gas is modularized for mounting and supporting the fuel cylinder easily in a motorcar without reconstructing a conventional car-body and necessitating troublesome fuel pipe arranging work after mounting the fuel cylinder. The modularized fuel cylinder comprises a supporting frame fixed to the fuel cylinder, fuel pipes neighboring the fuel cylinder and a joint box on which the fuel pipes concentrate attached to the supporting frame integrally. The fuel cylinder module is detachably fixed to a car-body side supporting frame provided on a rear floor of the motorcar.

5 Claims, 15 Drawing Sheets

FUEL CYLINDER MOUNTING STRUCTURE IN MOTORCAR

BACKGROUND OF THE INVENTION

1. Field of the Invention

The present invention relates to a fuel cylinder mounting structure in a motorcar running by a gas fuel such as natural gas.

2. Description of the Related Art

Figure 16:
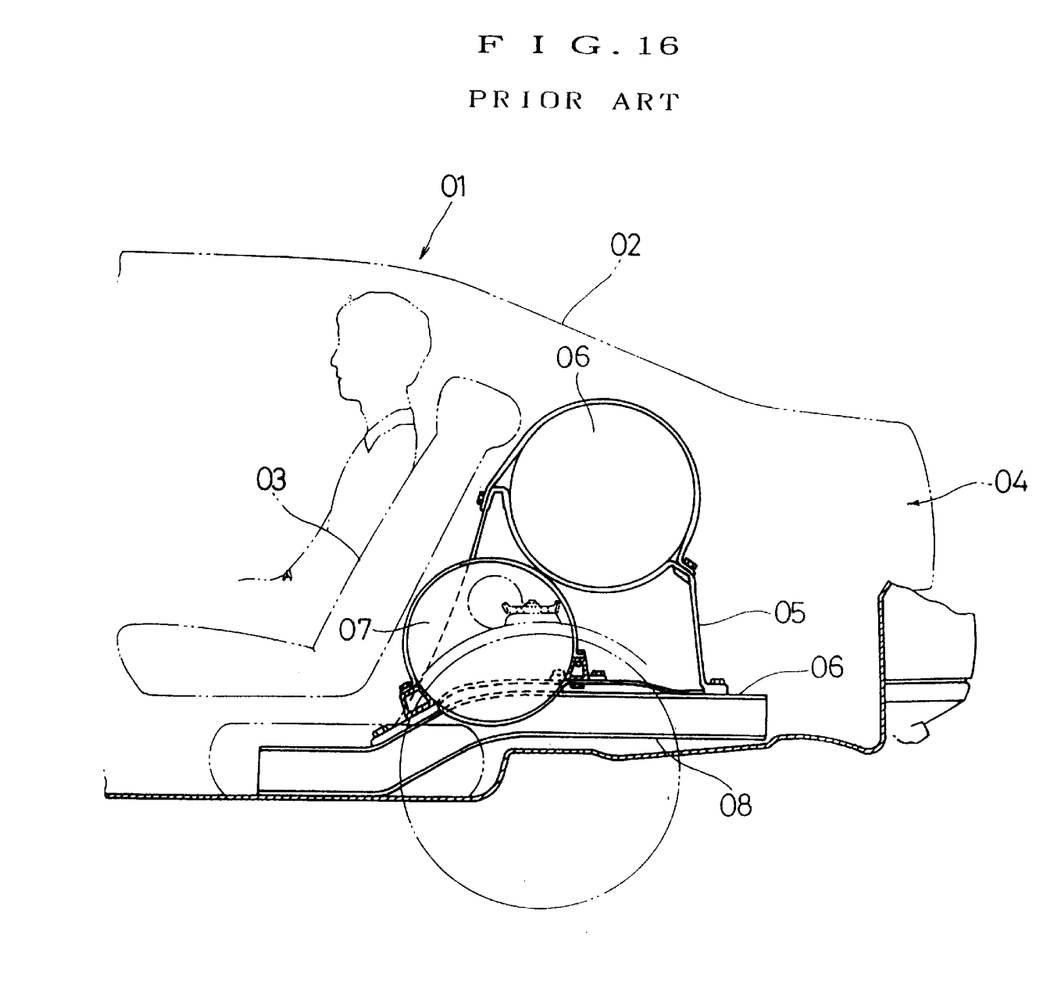
FIG. 16 is a side view of rear half of a car-body showing a conventional fuel cylinder supporting structure.

FIG. 16 shows a prior art disclosed in Japanese Laid-Open Patent Publication No. Hei 7-186741 (1995). In this prior art, in a rear part of a car-body 02 of a motorcar 01 and within a trunk room in rear of a rear seat back 03 are mounted two fuel cylinders 06, 07 supported by a cylinder supporting frame 05. The cylinder supporting frame 05 is fixed to a car-body frame 08 through a rear floor 06.

The cylinder supporting frame 05 is constituted as a large-sized one body for it supports two fuel cylinders 06, 07. The cylinders 06, 07 is positioned up and down along a rear surface of the rear seat back 03.

Fuel pipes extending from the fuel cylinders 06, 07 will concentrate in the space formed under the upper fuel cylinder 06 and behind the lower fuel cylinder 07.

Figure 17:
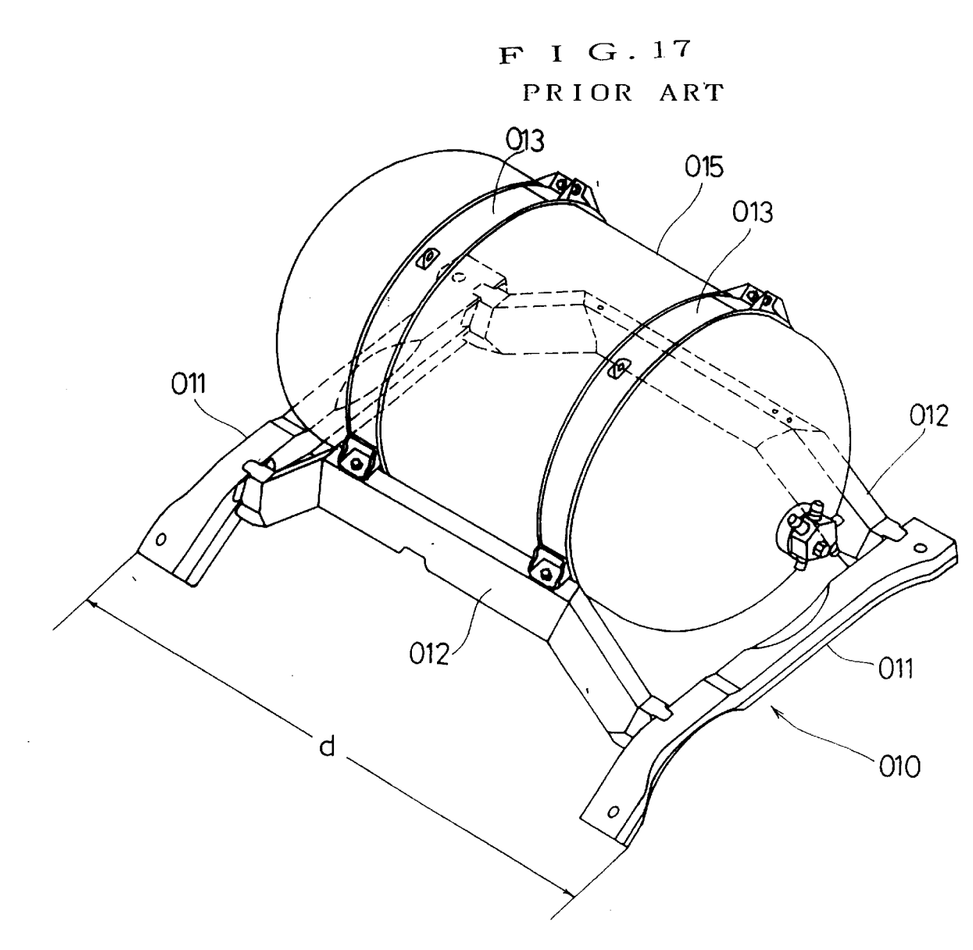
FIG. 17 is a perspective view showing another conventional fuel cylinder supporting structure.

FIG. 17 shows another conventional supporting structure in case of mounting single fuel cylinder. The cylinder supporting frame 010 is formed beforehand as a rectangular framework of one body by right and left side members 011, 011 elongated in front and rear direction and front and rear cross members 012, 012 elongated in right and left direction and bridging over the right and left side members 011, 011.

The fuel cylinder 015 is pinched between the front and rear cross members 012, 012 and tightened by two fixing belts 013, 013 to be fixed.

A not shown fuel pipe extends from a cylinder cap 016 at an end of the fuel cylinder 015 directly below penetrating the floor.

Nowadays, a motorcar using natural gas as its fuel is manufactured by reconstructing a car for mass production using gasoline or the like as its fuel. Therefore, it is required that the reconstruction of the car-body is minimized and assembling is simple.

However, in the prior art shown in FIG. 16 having two fuel cylinders 06, 07 mounted, the cylinder supporting frame 05 for supporting the fuel cylinders 06, 07 is a large-sized one body. Therefore, for installing the fuel cylinders 06, 07, the cylinder supporting frame 05 is fixed to the car-body side beforehand, and then the fuel cylinders 06, 07 are brought into the car through the opening with the rear window removed to be supported by the cylinder supporting frame 05. Such a installing work is troublesome.

Since the cylinder supporting frame 05 is large-sized, installing of the frame 05 itself is not easy, and if the cylinder supporting frame 05 also must be brought into the car through the opening for the rear window because of a shape of a rear floor or the like of a customary car, there occurs many problems such that the opening of the rear window must be enlarged.

Moreover, even after mounting the fuel cylinder, arrangement of fuel pipes must be carried out utilizing a narrow space within the car-body that is not easy.

In the other prior art shown in FIG. 17 having single fuel cylinder 015 mounted, since the cylinder supporting frame 010 is formed beforehand as a rectangular framework of one body by bridging the front and rear cross members 012, 012 over the right and left side members 011, 011, the maximum width of the cylinder supporting frame is large, and it is difficult to bring an assembly of the cylinder supporting frame 010 and the fuel cylinder 015 into the car because of size of opening on the car-body side or the like, therefore, the frame 010 and the cylinder 015 must be installed separately so that the work is troublesome or reconstruction of the car-body is necessitated to cause a higher cost. Similarly to the former prior art, fuel pipe arranging work is troublesome.

SUMMARY OF THE INVENTION

The present invention has been accomplished in view of the above-mentioned problems and one object of the invention is to provide a fuel cylinder mounting structure of a motorcar in which the fuel cylinder is modularized for mounting and supporting the fuel cylinder easily without reconstructing the car-body and no troublesome fuel pipe arranging work is necessary after mounting the fuel cylinder.

In order to attain the above object, the present invention provides a fuel cylinder mounting structure in a motorcar characterized in that the fuel cylinder mounting structure has a fuel cylinder module comprising a fuel cylinder for storing a compressed fuel gas, a supporting frame fixed to the fuel cylinder, fuel pipes neighboring the fuel cylinder, and a joint box on which the fuel pipes concentrate attached to the supporting frame integrally, and the fuel cylinder module is detachably fixed to a car-body side supporting portion provided on a rear floor of the motorcar for supporting the fuel cylinder.

Since the fuel cylinder, the supporting frame, the fuel pipes neighboring the fuel cylinder and the joint box are unified into a small, handy and intensive fuel cylinder module, the fuel cylinder can be easily mounted and fixed in the car-body without reconstructing the car-body. And it is not necessary to perform' a troublesome fuel pipe arranging work after mounting the fuel cylinder so that the attaching work can be done efficiently, productivity is improved and cost can be reduced.

If the car-body side supporting portion is formed by a car-body side supporting frame fixed between right and left rear wheel houses, a frame for supporting the fuel cylinder is divided into a module side sub-frame and a car-body side sub-frame, so that mounting of the fuel cylinder can be facilitated by miniaturizing the module side sub-frame namely the supporting frame to be fixed to the fuel cylinder.

According to another aspect of the present invention, there is provided a fuel cylinder mounting structure in a motorcar, comprising a pair of right and left car-body side supporting frames fixed on a car-body frame between right and left wheel houses within a trunk room and elongated in before-and-behind direction of the car; a fuel cylinder for storing a compressed fuel gas directed widthwise of the car; a pair of front and rear cylinder side supporting frames elongated widthwise of the car and fixed to the fuel cylinder so as to pinch the fuel cylinder from before and behind, the cylinder side supporting frames being detachably fixed to the car-body side supporting frames for supporting the fuel cylinder from bottom.

The fuel cylinder is fixed to the car-body by placing the cylinder side supporting frames fixed to the fuel cylinder on the car-body side supporting frames fixed to the car-body frame and fixing the both supporting frames, therefore, fixing of the fuel cylinder is easy. Further, since the fuel cylinder is brought into the car-body in a non-bulky state that only the cylinder side supporting frames elongated widthwise of the car are attached, the fuel cylinder can be mounted easily without necessity of reconstructing the car-body.

If an upper surface of the car-body side supporting frame is made flat, the cylinder side supporting frame can be move on the car-body side supporting frame easily when the fuel cylinder is mounted, attached or detached to facilitate the attaching and detaching work.

According to a further aspect of the present invention, there is provided a fuel cylinder mounting structure in a motorcar having a fuel cylinder for storing a compressed fuel gas arranged in rear of a rear seat back directed widthwise of the car and supported from bottom by a front supporting frame and a rear supporting frame pinching the fuel cylinder from before and behind, the front supporting frame being fixed to a body frame and projected high between the rear seat back and the fuel cylinder, fuel pipes being concentrated under the front supporting frame.

Since the front supporting frame is fixed to a body frame and projected high between the rear seat back and the fuel cylinder, the fuel cylinder is separated from the car room and prevented from moving.

Since fuel pipes are concentrated under the front supporting frame projected high above the car-body frame, the place where the fuel pipes are concentrated is protected by the front supporting frame. Further the rear side of the place is protected by the fuel cylinder fixed firmly.

If a joint box on which the fuel pipes concentrate is attached to the front supporting frame integrally, assembling of the fuel cylinder is facilitated.

DETAILED DESCRIPTION OF THE PREFERRED EMBODIMENT

Hereinafter, a preferred embodiment of the present invention will be described with reference to FIGS. 1 to 15.

Figure 1:
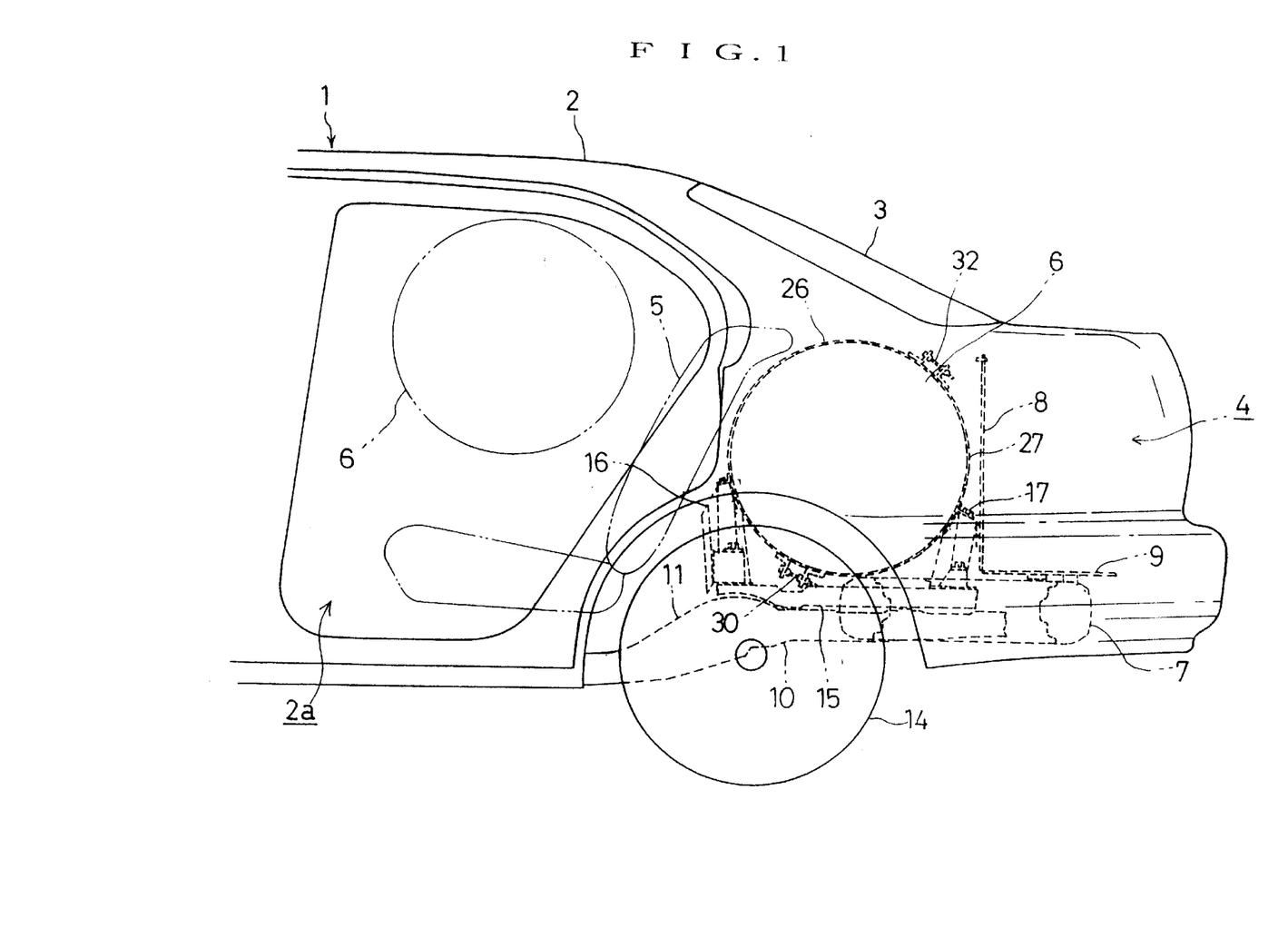
FIG. 1 is a partly omitted side view showing a rear half of a motorcar according to a preferred embodiment of the present invention.

FIG. 1 is a partly omitted side view showing a rear half of a motorcar 1 according to the embodiment. This motorcar 1 runs using natural gas as its fuel and has a compressed fuel cylinder 6 for storing the compressed natural gas mounted.

A car-body 2 of the motorcar 1 has a large door opening 2a for a rear door formed on a side of a rear half part at a position near the center, a rear window 3 fitted to a rear part of a roof and a trunk room 4 formed at a swelled portion under and behind the rear window. Within the trunk room 4 and in rear of a seat back 5 of a rear seat is disposed a fuel cylinder 6, under which a spare tire 7 is stored.

Therefore, front half part of the trunk room 4 is occupied by the fuel cylinder 6 and the rear half part partitioned by a partition plate 8 is used as a storeroom. A bottom plate of the storeroom is formed by an openable lid 9 partitioning the portion for storing the spare tire to facilitate taking in and out of the spare tire.

The bottom portion at rear half of the car-body is formed with a pair of right and left car-body side frames 10 extending in before-and-behind direction and a rear floor supported on the side frames 10. On the rear floor 11 is placed the spare tire 7 and fixed the fuel cylinder 6 through a supporting frame.

Figure 2:
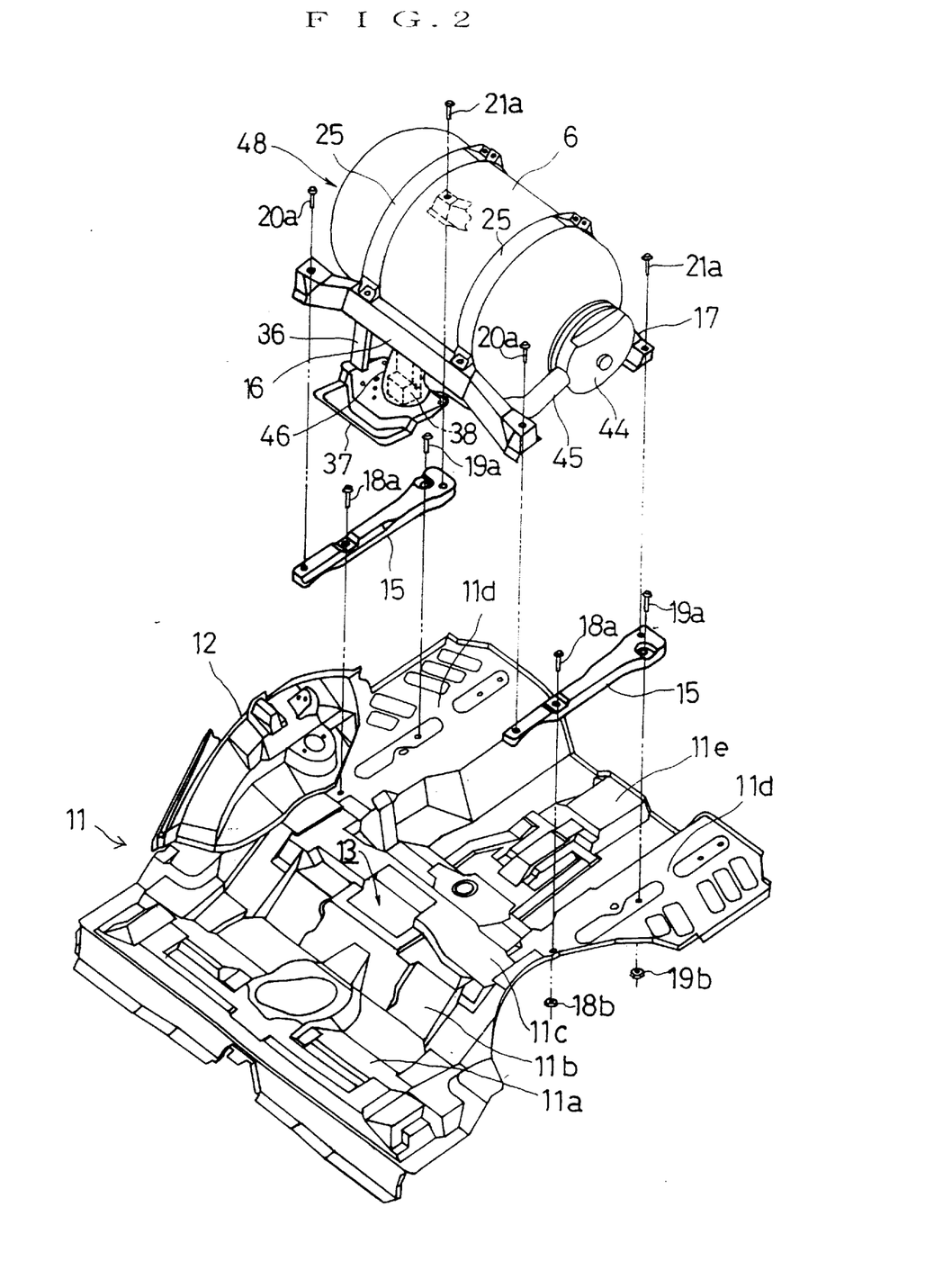
FIG. 2 is an exploded perspective view for illustrating an attachment structure of a fuel cylinder module.

As shown in FIG. 2, the rear floor 11 is made in a shape of a rectangular plate generally, and has a somewhat low front portion 11a and a high middle portion 11c connected to front portion 11a through an inclined portion 11b. On both sides of the middle portion 11c are formed wheel houses 12, 12 (in FIG. 2, a left side wheel house is omitted) swelled in the shape of cup, covering above the rear wheels 14, 14.

At a central portion in width of the middle portion 11c of the rear floor 11 is formed a rectangular hole 13. Behind the middle portion 11c right and left side portions 11d, 11d of the same height as the middle portion 11c extend rearward and a depressed portion 11e is formed between the side portion 11d, 11d. The spare tire 7 is stored in this depressed portion 11e.

The supporting frame for supporting the fuel cylinder 6 is constituted by assembling a pair of right and left side supporting frames 15, 15 elongating in before-and-behind direction of the car-body and a pair of front and rear supporting frames 16, 17 elongating in widthwise direction of the car-body. The side supporting frames 15. 15 are previously fixed to the both side portions 11d, 11d of the rear floor along the right and left wheel houses 12, 12 by means of bolts 18a, 19a and nuts 18b, 18b.

Figure 3:
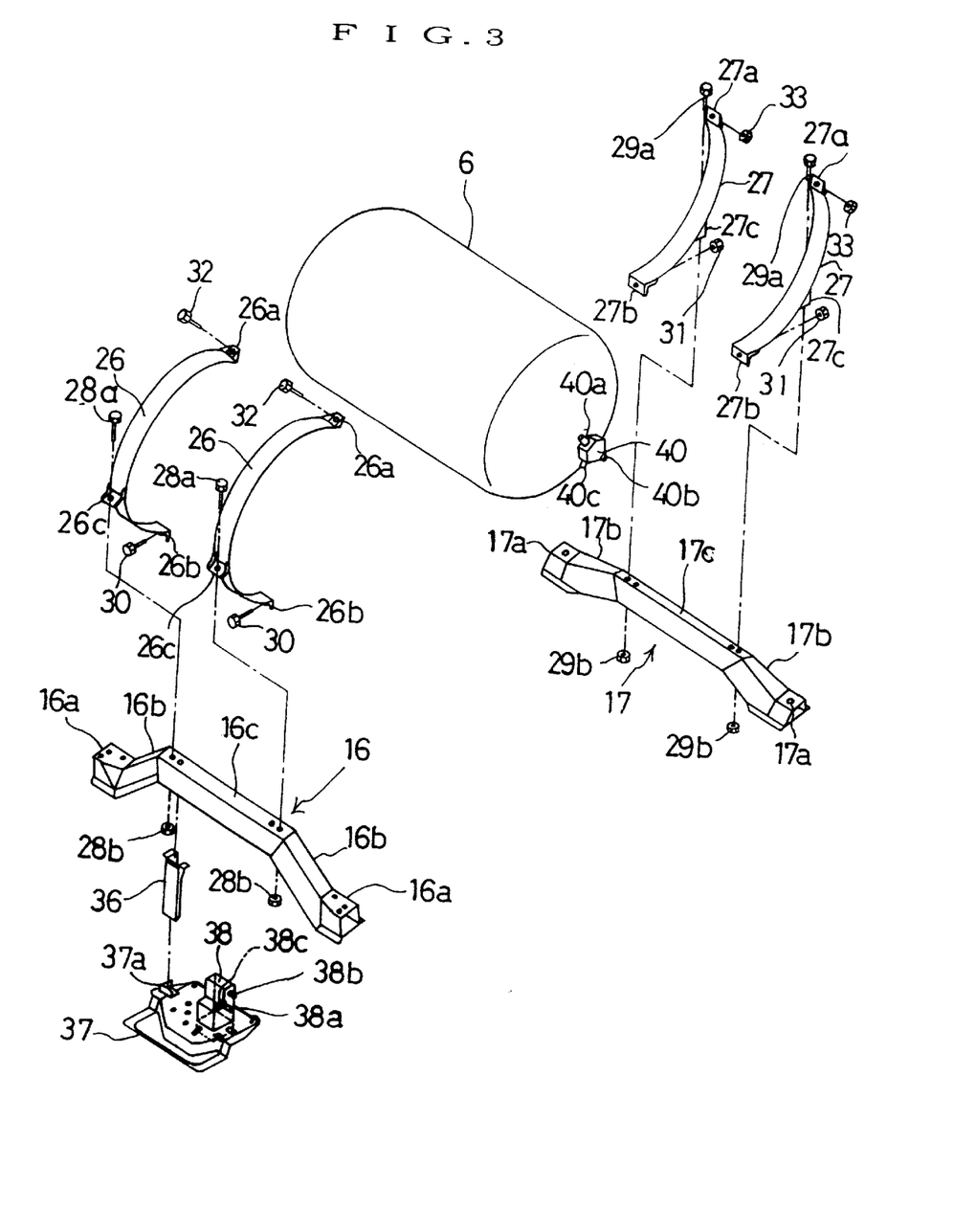
FIG. 3 is an exploded perspective view of the fuel cylinder module.

The front supporting frame 16 and the rear supporting frame 17 are fixed to the fuel cylinder 6 by two fixing belts 25, 25 and jointly fixed to the side supporting frames 15. 15 by bolts 20a, 21a. FIG. 3 is an exploded perspective view showing the structure for attaching the front and rear supporting frames 16, 17 to the fuel cylinder 6.

The front supporting frame 16 is of a bridge-like shape having right and left fixing parts 16a, 16a, inclined parts 16b, 16b inside of the fixing parts and a particularly high horizontal central part 16c. The rear supporting frame 17 is also formed in a bridge-like shape having right and left fixing part 17a, 17a, inclined parts 17b, 17b and a horizontal central part 17c, but the horizontal central part 17c is lower than the central part 16c of the front supporting frame 16.

Each of the fixing belts 15 is made of steel and divided into two halves 26, 27 of semicircular arcuate shape cooperating to tighten the fuel cylinder 6. The belt halves 26, 27 have tightening pieces 26a, 26b and 27a, 27b welded at the both ends respectively. Further, attaching pieces 26c and 27c are welded at predetermined portions on outer circumferential surfaces of the belt halves 26 and 27 respectively. On inner circumferential surfaces of the belt halves 27, 27 are affixed elastic members having large coefficient of friction.

In order to attach the front and rear supporting frames 16, 17 to the fuel cylinder 6 by the fixing belts 25, firstly the attaching piece 26c of the belt half 26 is fixed to a corresponding side portion of the horizontal central part 16c of the front supporting frame 16 by the bolt 28a and the nut 28b, thus the belt halves 26, 26 are attached to the front supporting frame 16. In like manner, the other belt halves 27, 27 are attached to the rear supporting frame 17 by the bolts 29a and the nuts 29b.

Next, a position of axis of the fuel cylinder 6 is set by a jig and the belt halves 26, 27 respectively attached to the front and rear supporting frames 16, 17 are fitted around the fuel cylinder 6 at respective predetermined positions and opposite lower tightening pieces 26b, 27b are preliminarily tightened together by the tightening bolts 30 and nuts 31.

Then, opposite upper tightening pieces 26a, 27a are tightened together by the tightening bolts 32 and nuts 33 while the lower tightening bolts 30 and nuts 31 are also tightened for adjustment, so that interference of the upper tightening pieces 26a, 27a and interference of the lower tightening pieces 26b, 26b are adjusted alternately.

Since the fixing belts 25 can be tightened while interferences at the upper and lower side are adjusted as described above, even if the fuel cylinder 6 has outer diameters dispersed, the dispersion can be absorbed to precisely set the position of axis of the fuel cylinder 6 with respect to the supporting frames 16, 17. Further, it can be avoided that the supporting frames 16, 17 are given unnecessary stresses owing to larger and smaller diameters of the fuel cylinder 6.

Thus, the front and rear supporting frames 16, 17 elongating widthwise of the car-body are attached to the fuel cylinder 6 by the fixing belts 25 so as to pinch the fuel cylinder from before and behind, and from the front supporting frame 16 is hung a rectangular joint plate 37 by means of a bracket 36 elongating vertically. Namely, an upper portion of the bracket 36 is welded to a predetermined position of the horizontal central part 16c of the front supporting frame 16 and a lower end portion of the bracket 36 is fixed to a cut and raised piece 37a of the horizontal joint plate 37 by bolt and nut.

A joint box 38 on which fuel pipes concentrate penetrates the joint plate 37 vertically and fixed thereto by welding. The joint box 38 has six joints for the fuel pipes, among which three joints 38a, 38b, 38c are positioned above the joint plate 37 and remaining three joints 38d, 38e, 38f are positioned below the joint plate 37.

On the one hand, on a cylinder cap 40 at a left end portion of the fuel cylinder 6 are projected three joints 40a, 40b and 40c to which a charge connection pipe 41, a supply connection pipe 42 and a relief connection pipe 43 are connected respectively. Other ends of the charge connection pipe 41, the supply connection pipe 42 and the relief connection pipe 43 are connected to the joints 38a, 38b and 38c of the joint box 38 respectively.

Figure 4:
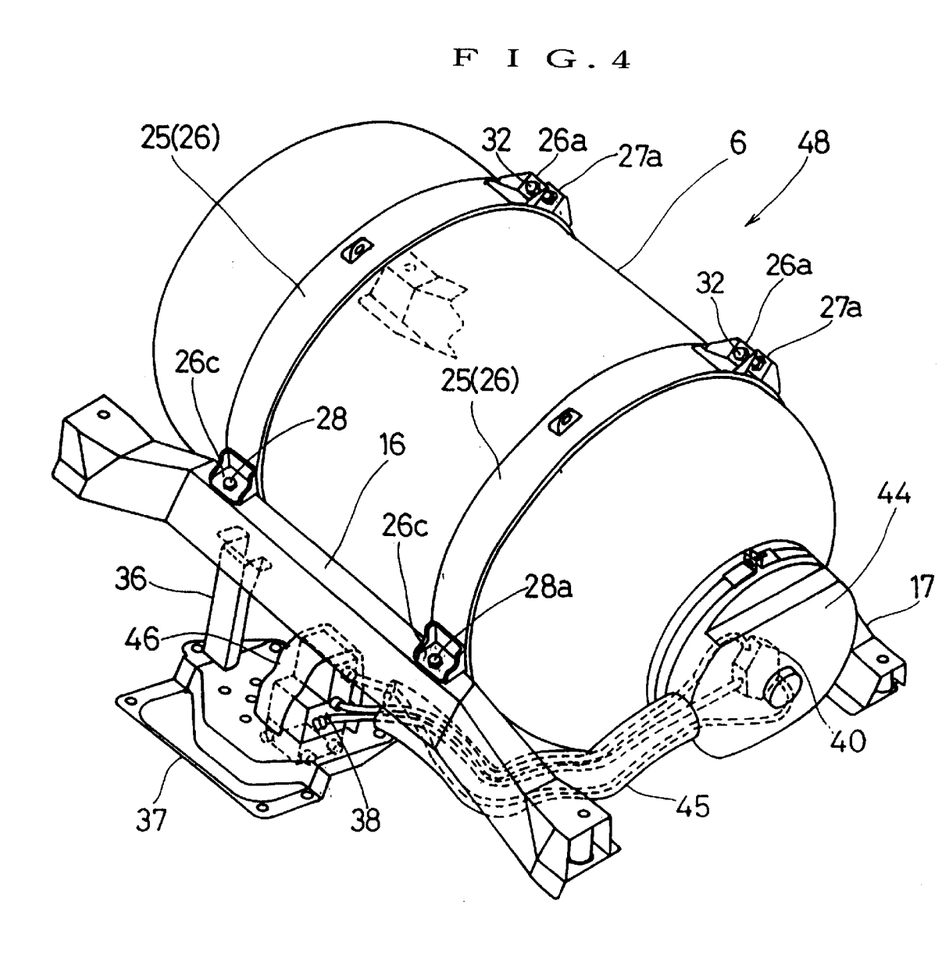
FIG. 4 is a perspective view of the fuel cylinder module.

As shown in FIG. 4, the cylinder cap 40 is covered airtightly by a cup-like cover 44. A tubular cover 45 extends from the cup-like cover 44 to the joint box 38 and covers the connection pipes 41, 42 and 43. The joint box 38 is covered by a joint cover 46.

The fuel cylinder 6, the front and rear supporting frames 16, 17 fixed to the fuel cylinder by the fixing belts 25, the joint box 38 and the connection pipes 41, 42, 43 neighboring the fuel cylinder are assembled integrally to constitute a fuel cylinder module 48 as shown in FIG. 4.

On the rear floor 11 on which the fuel cylinder module 48 is to be mounted and fixed are fixed a pair of right and left side supporting frames 15, 15 beforehand.

The fuel cylinder module 48 is inserted into the car-body through the door opening 2a for a rear door (FIG. 1) and moved rearward through the space between the right and left wheel houses 12, 12. Then the right and left end portions 16a, 17a of the front supporting frame 16 and the rear supporting frame 17 are placed on predetermined positions of the side supporting frames 15, 15 and fixed by the bolts 20a, 21a.

Figure 5:
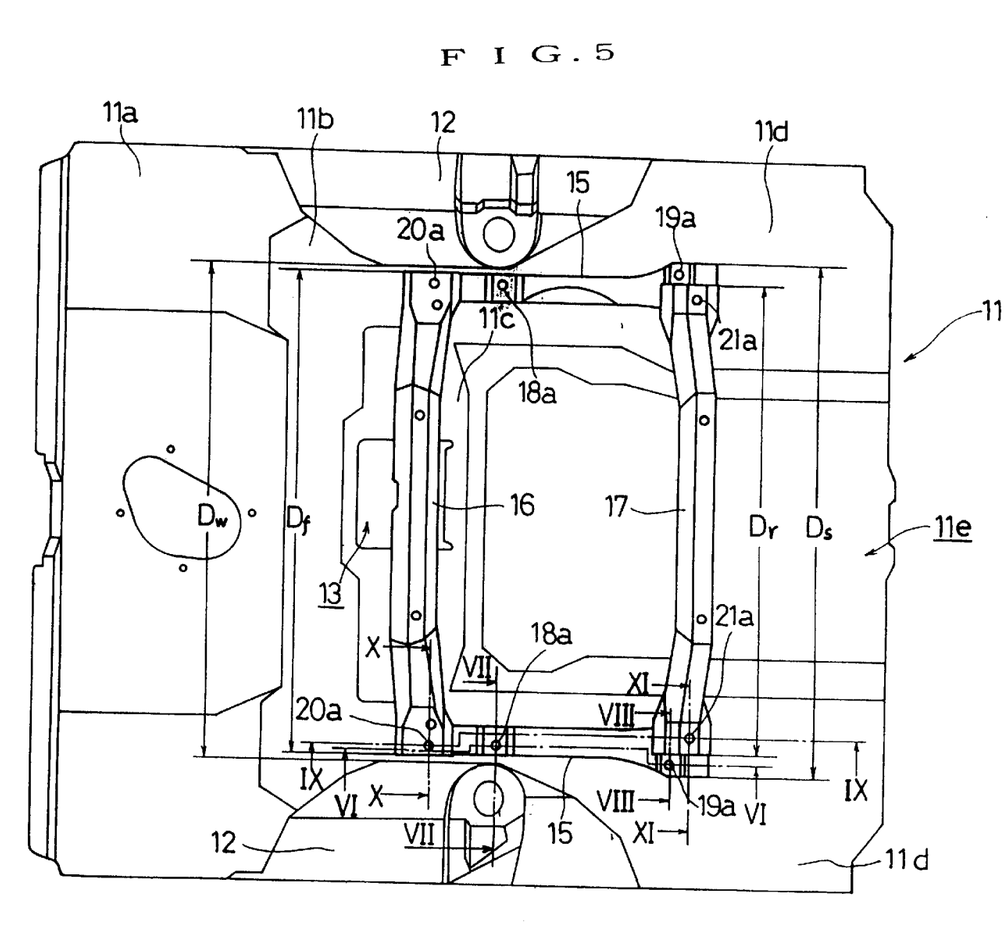
FIG. 5 is a plan view showing supporting frames attached to the rear floor.
Figure 6:
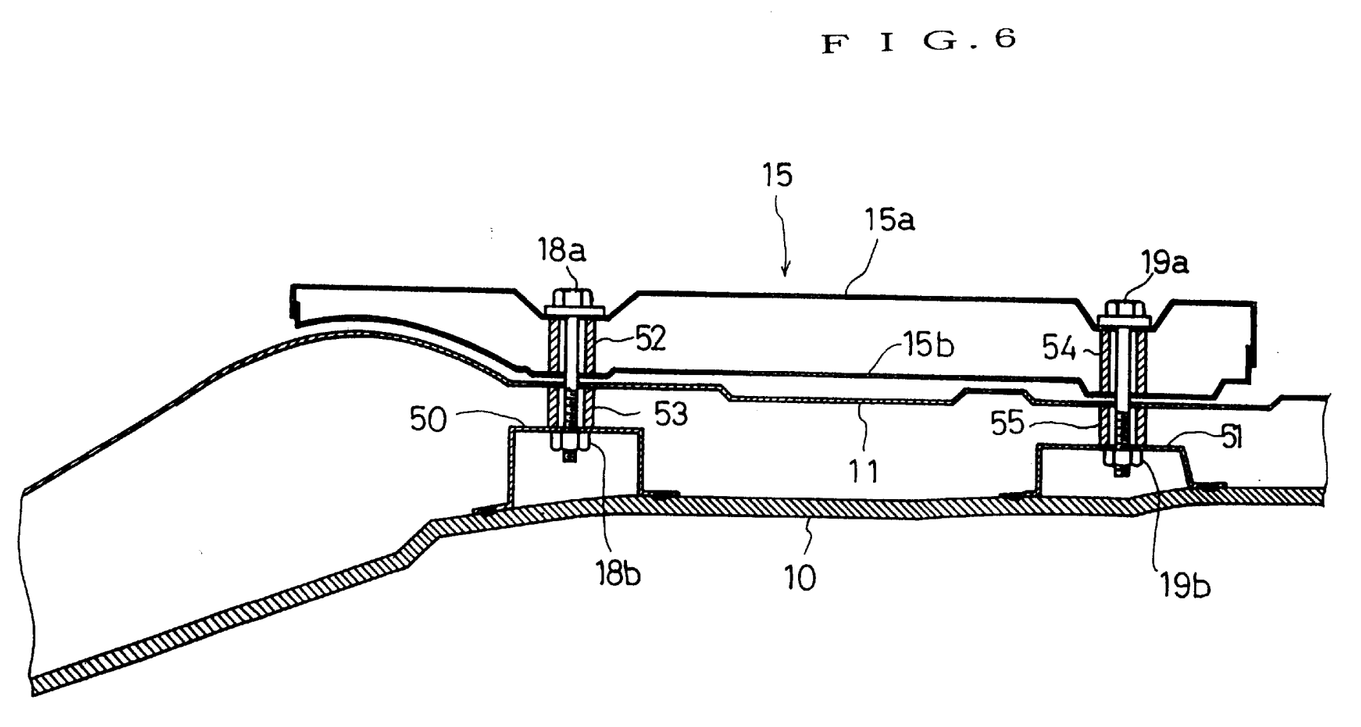
FIG. 6 is a section along the line VI—VI of FIG. 5.
Figure 7:
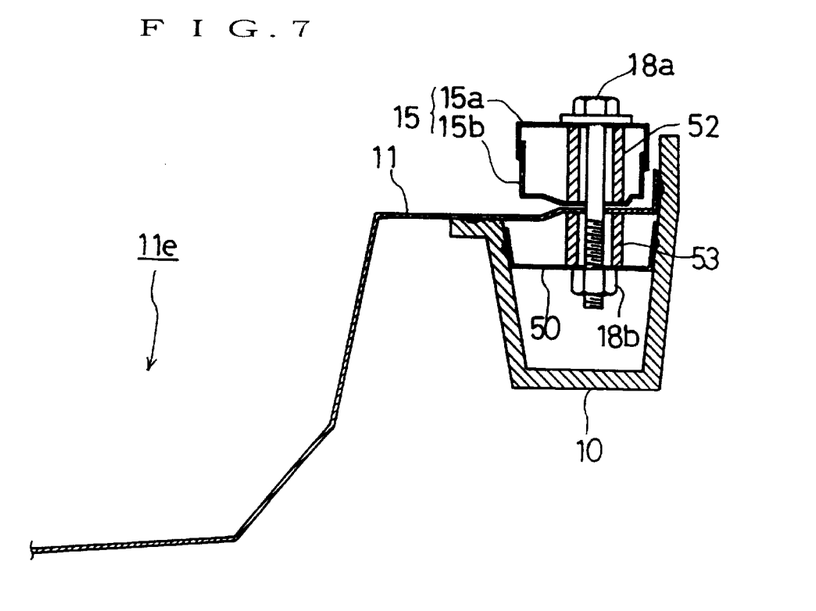
FIG. 7 is a section along the line VII—VII of FIG. 5.
Figure 8:
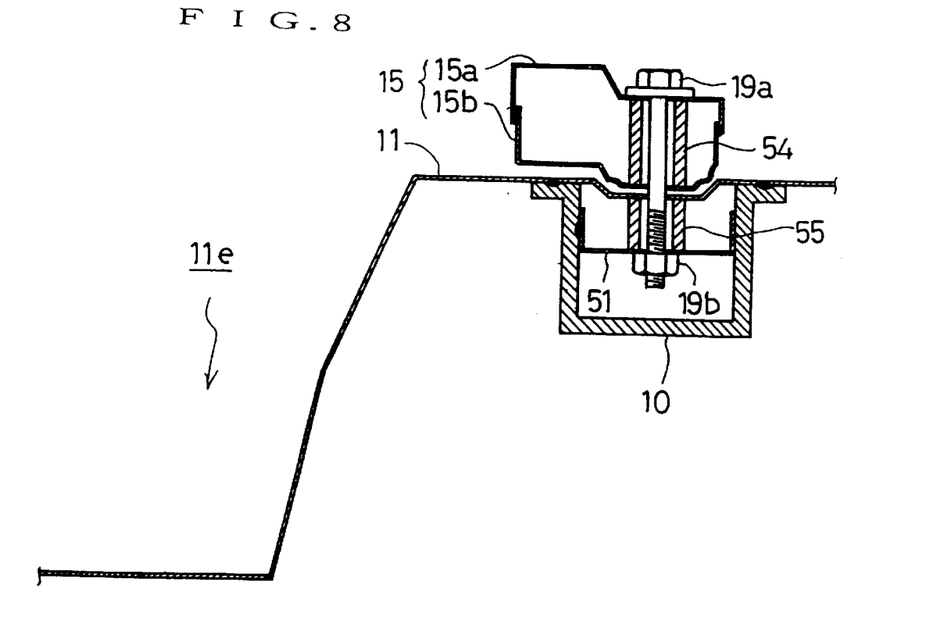
FIG. 8 is a section along the line VIII—VIII of FIG. 5.
Figure 9:
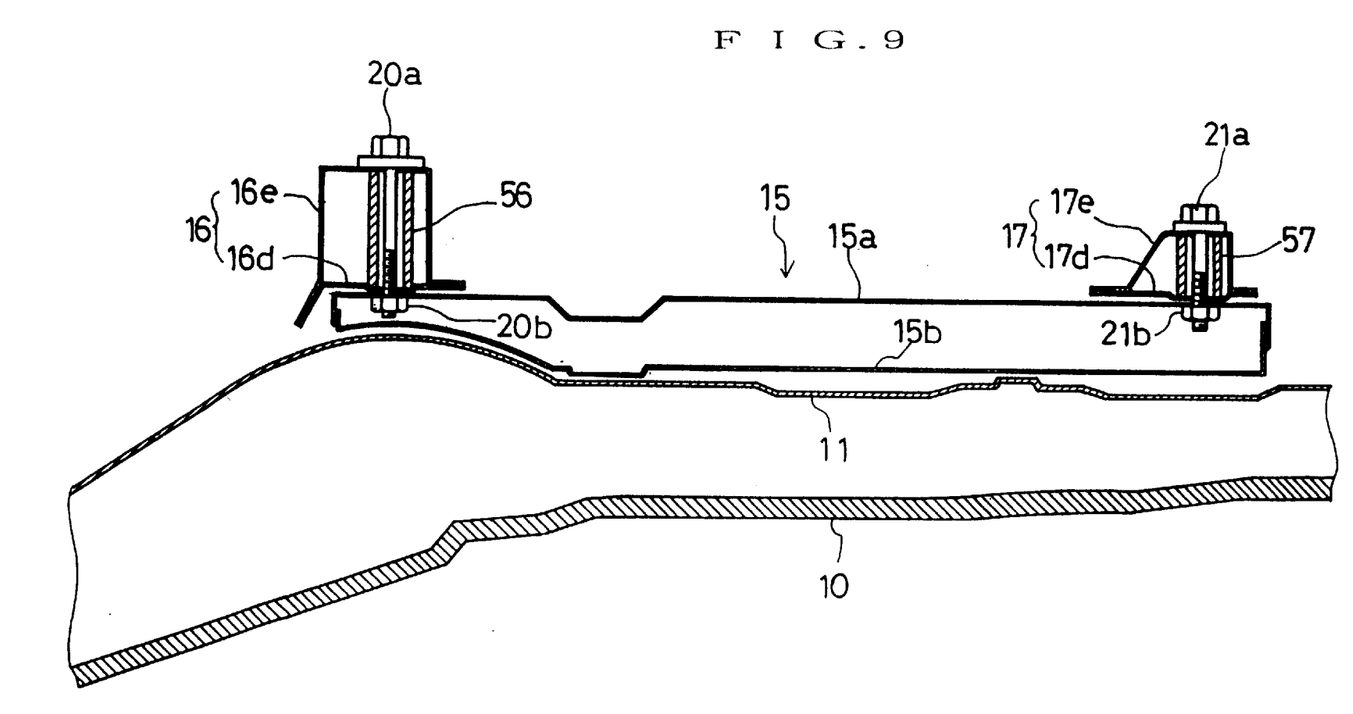
FIG. 9 is a section along the line IX—IX of FIG. 5.
Figure 10:
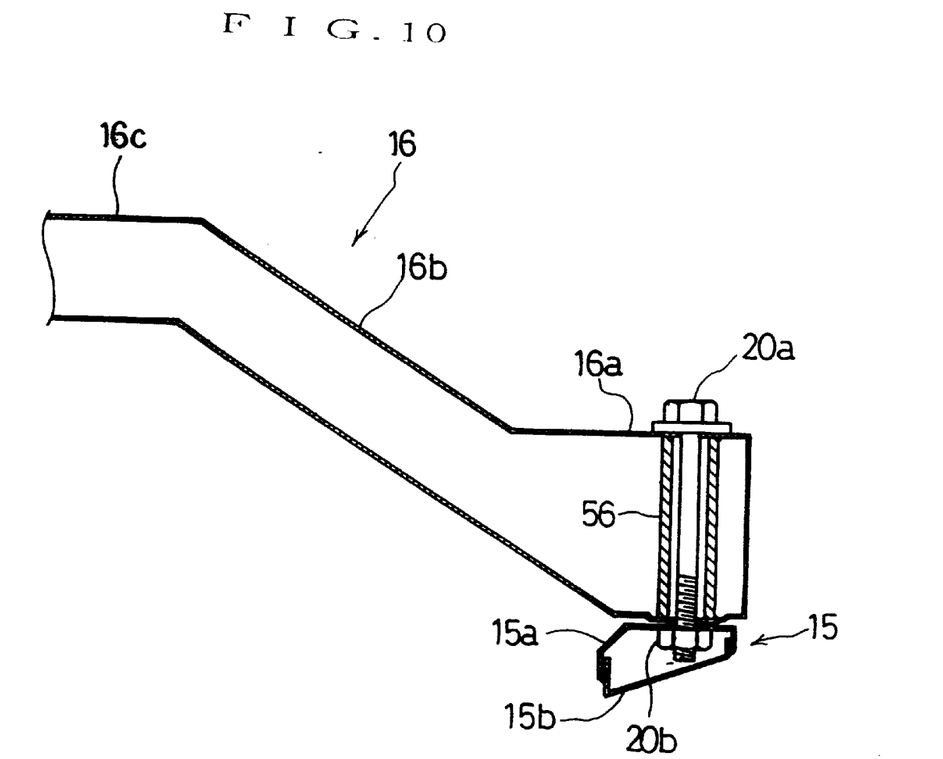
FIG. 10 is a section along the line X—X of FIG. 5.
Figure 11:
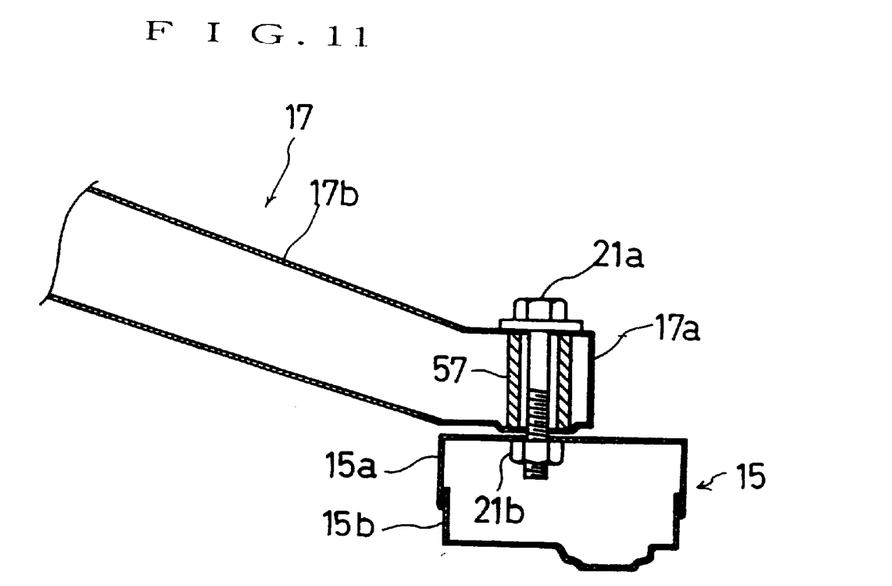
FIG. 11 is a section along the line XI—XI of FIG. 5.

FIGS. 5 to 11 show constructions for attaching the side supporting frames 15, 15, the front supporting frame 16 and the rear supporting frame 17 to the rear floor 11. As shown in FIG. 5, a widthwise length Df of the front supporting frame 16 is longer a little than a length Dr of the rear supporting frame 17, but somewhat shorter than a widthwise length Dw between the right and left wheel houses 12, 12.

Therefore, the fuel cylinder module 48 with the front supporting frame 16 integrally assembled can be mounted through the space between the wheel houses 12, 12 without any interference and trouble.

The maximum widthwise length Ds between respective outer sides of the right and left side supporting frames 15, 15 is larger than the widthwise length Dw between the right and left wheel houses 12, 12. Therefore, if the side supporting frames 15, 15 are included in the fuel cylinder module 48, its mounting on the rear floor becomes difficult. Accordingly, in the present embodiment, the side supporting frames 15, 15 are attached to the rear floor beforehand.

Since the fuel cylinder 6 can be mounted by moving it from the front part in the car-body 2 into the trunk room 4, a troublesome mounting work such that the fuel cylinder is inserted through an opening with the rear window 3 removed is unnecessary and it is also unnecessary to reconstruct the car-body in order to avoid interference.

Since the pipes neighboring the fuel cylinder are also mounted together with the fuel cylinder as the fuel cylinder module 48, a troublesome work to arrange the pipes after mounting the fuel cylinder is unnecessary, therefore the installing work is simple and the work is very efficient.

The structure for attaching the side supporting frame 15 shown in FIGS. 5 to 8 will be explained. The side supporting frame 15 is a hollow tubular member constructed by upper and lower long rectangular box bodies 15a, 15b put one above another with open sides faced and fitting portion welded. The side supporting frame 15 is placed at a predetermined position on a side portion 11d of the rear floor 11 along the wheel house 12 directed in the before-and-behind direction. Bolts 18a, 19a penetrate front and rear portions of the side supporting frame 15 from above.

The upper box body 15a has a flat upper surface formed with depressions at positions corresponding to the bolts 18a, 19a so that heads of the screwed bolts are not projected from the upper surface.

Within the car-body side frame 10 having a U-shaped section opened upward are provided horizontal brackets 50, 51 at positions corresponding to the bolts 18a, 19a. The bolts 18a, 19a penetrate the brackets 50, 51 as well as the rear floor 11 and nuts 18b, 19b are screwed and tightened onto the ends of the bolts 18a, 19a. Within the side supporting frame 15 are inserted collars 52, 53 and between the rear floor 11 and the brackets 50, 51 are inserted collars 54, 55.

Structures for attaching the front supporting frame 16 and the rear supporting frame 17 on the right and left side supporting frames 15, 15 are shown in FIG. 5 and FIGS. 8 to 11.

Both the front and rear supporting frames 16, 17 are hollow tubular members having bottom plates 16d, 17d and long rectangular box bodies 16e, 17e covering the bottom plates 16d, 17d and welded thereto. These front and rear supporting frames 16, 17 are made integral with the fuel cylinder 6 as the fuel cylinder module 48 and placed on the right and left side supporting frames 15, 15. Since the upper surfaces of the side supporting frames 15, 15 are flat, both front and rear supporting frames 16, 17 can be moved freely on the side supporting frames 15, 15 so that attaching work of the fuel cylinder module 48 is easy.

The front and rear supporting frames 16, 17 placed at predetermined positions on the side supporting frames 15, 15 are penetrated by bolts 20a, 21a from above. The bolts 20a, 21a further penetrate the upper box body 15a of the side supporting frame 15 and are screwed and tightened to nuts 20b, 21b welded onto the inner surface of the box body 15a. Within the front and rear supporting frames are inserted collars 56, 57.

Thus, the fuel cylinder module 48 is fixed firmly at a predetermined position on the rear floor 11. The fuel cylinder module 48 can be placed on the rear floor 11 very easily and following fixing work by the bolts 20, 21 is also easy so that the attaching work of the fuel cylinder 6 can be done very efficiently to improve productivity.

When the fuel cylinder module 48 is fixed onto the predetermined position of the rear floor 11, the joint plate 37 hung from the front supporting frame 16 closes the rectangular hole 13 formed at the central portion 11a of the rear floor 11. A periphery of the joint plate 37 is fixed to the rear floor by a bolt and the joint box 38 projects downward from the lower surface of the rear floor 11.

The joints 38d, 38e, 38f provided on the lower part of the joint box 38 projecting downward from the rear floor 11 are respectively connected with a charge pipe 61, a supply pipe 62 and a relief pipe 63 arranged under the rear floor 11 and outside of the trunk room. When the fuel cylinder module 48 is mounted to the rear floor 11, arrangement of the fuel pipes neighboring the fuel cylinder above the rear floor has been completed already and only arrangement of the pipes 61, 62, 63 below the rear floor is required, therefore piping works are easy.

Figure 15:
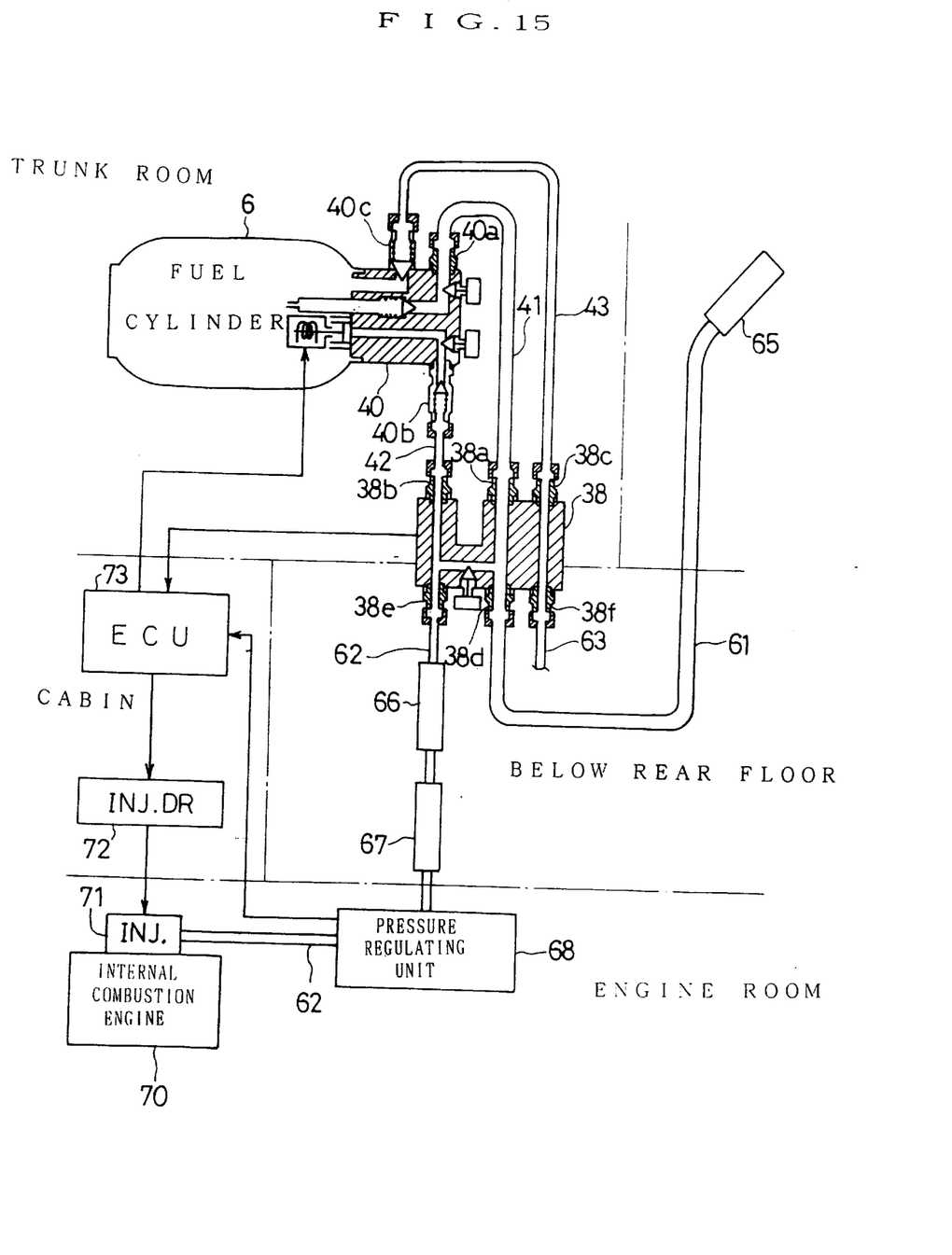
FIG. 15 is an illustration showing fuel pipes and the control system.

As shown in FIG. 15, the charge pipe 61 arranged below the rear floor 11 is extended upward along a side wall of the rear floor 11 and connected to a fuel charge mouth 65 provided on an outer plate of the car-body. The supply pipe 82 with a hand-operated valve 66 and a strainer 67 inserted in the midway arranged below the rear floor 11 enters an engine room wherein the pipe 62 is connected to a pressure regulating unit 68 and an injector 71 provided on a suction pipe of an internal combustion engine 71 in turn.

The injector 71 is driven by an injector driver 72 for controlling fuel supply timing according to ECU 73 which is inputted with information of inner pressure and temperature detected at the joint box 38 and the pressure regulating unit 68 to drivingly control the injector driver 72 and control opening and closing of a valve connected to the supply pipe 42 of the fuel cylinder 6.

Figure 12:
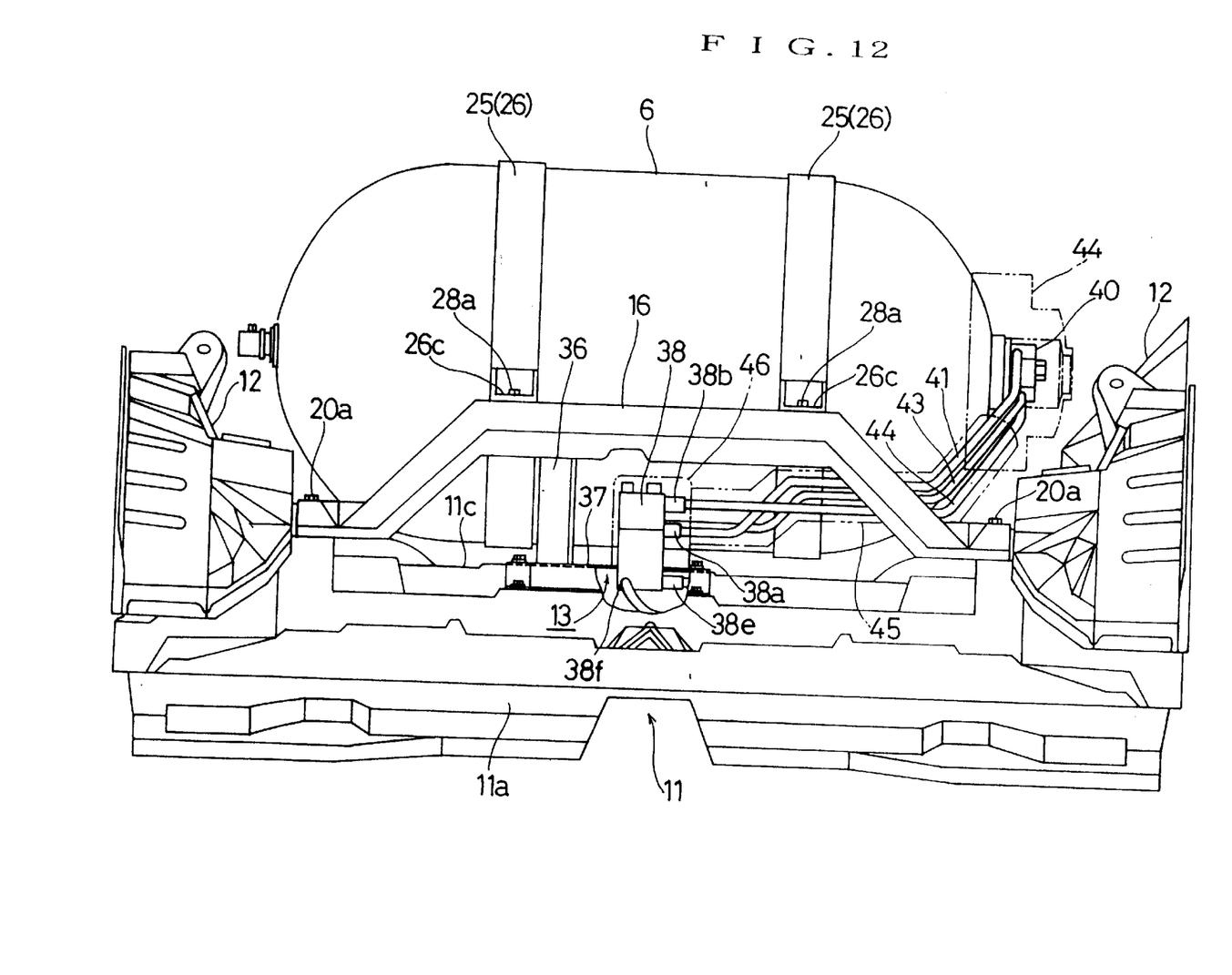
FIG. 12 is a front view of the fuel cylinder module attached to the rear floor.
Figure 13:
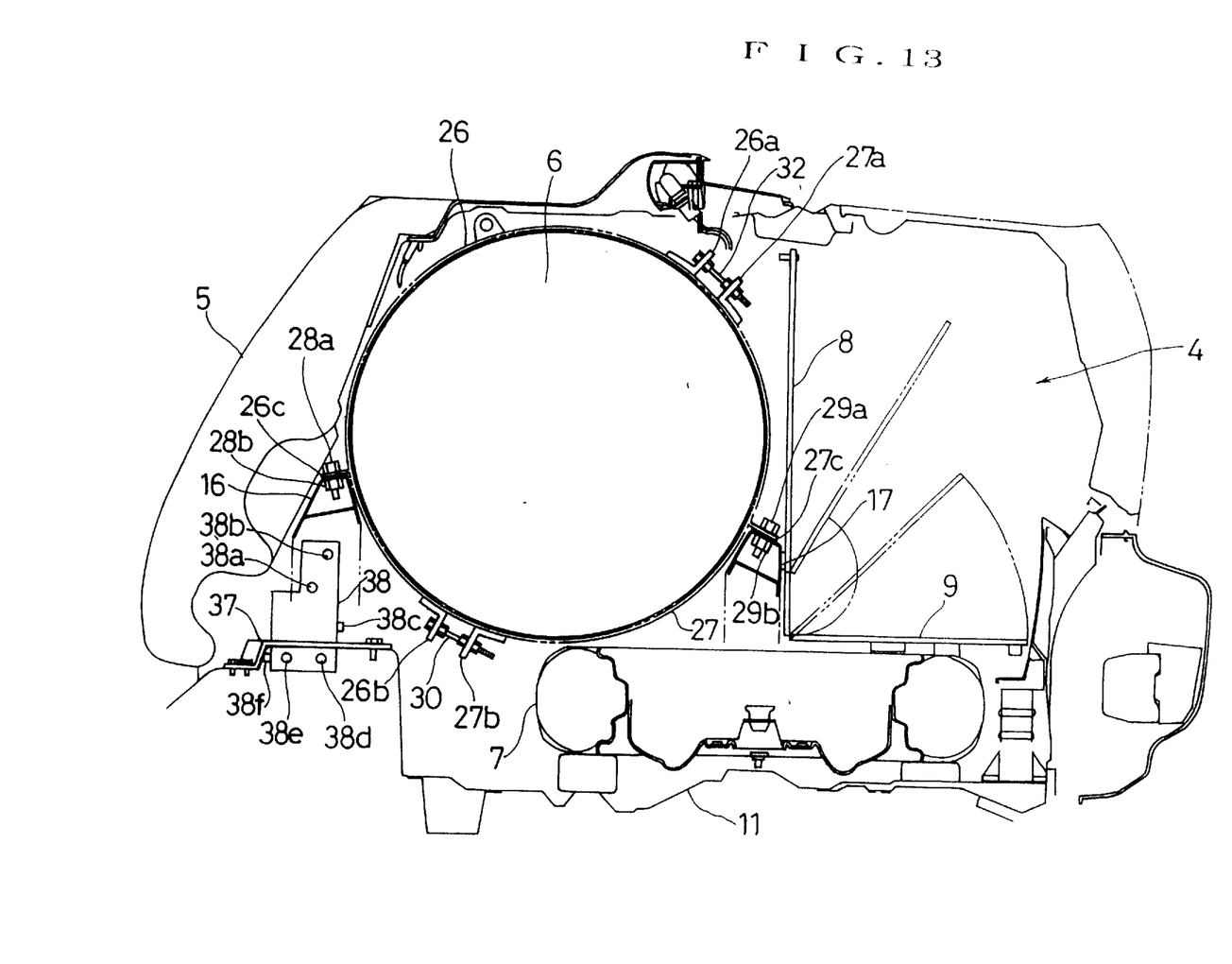
FIG. 13 is a side view thereof.
Figure 14:
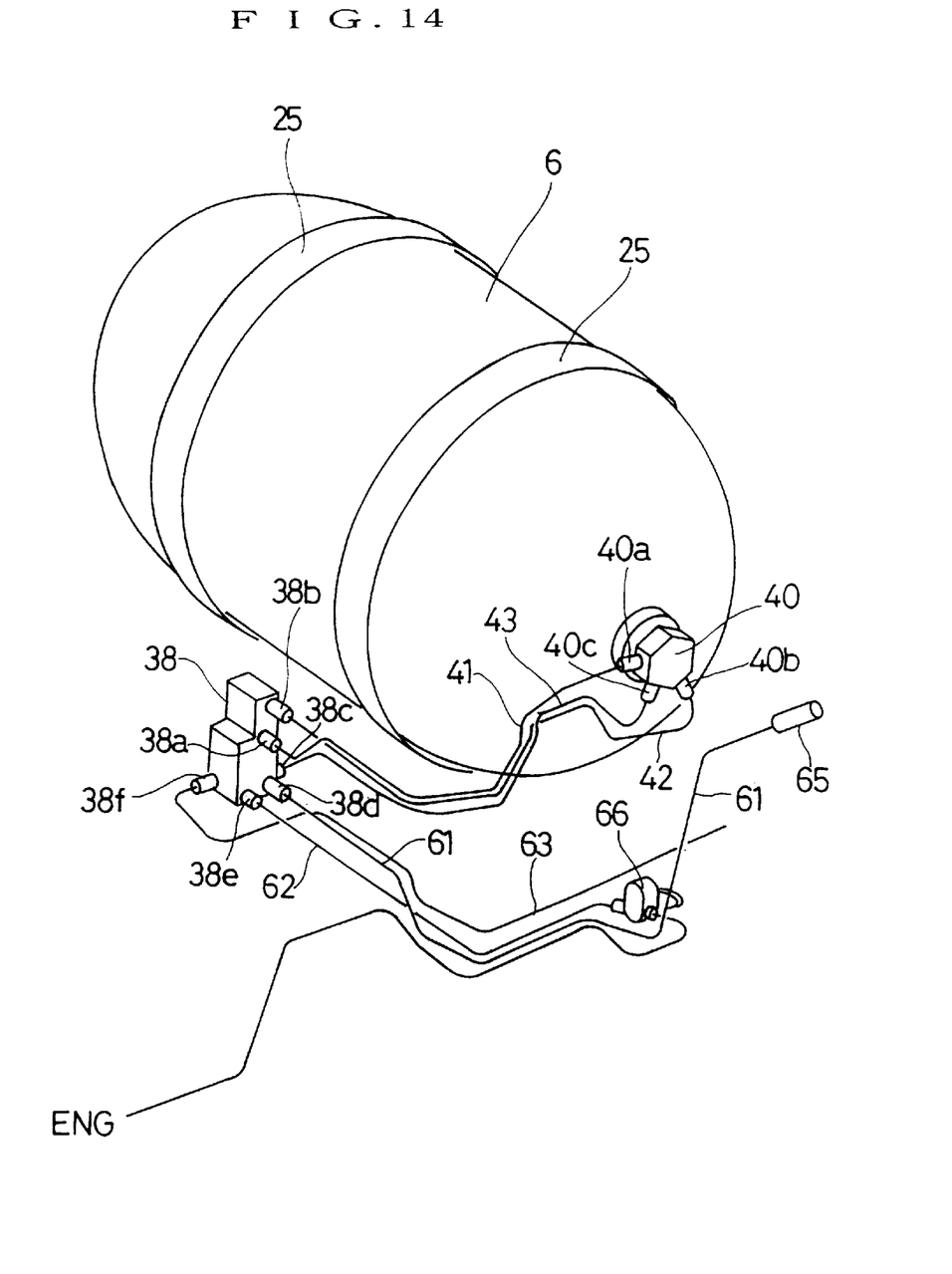
FIG. 14 is an illustration showing fuel pipes.

As shown in FIGS. 12 and 13, the joint box 38 on which the fuel pipes concentrate is positioned between the seat back 5 and the fuel cylinder 6 and protected by the front supporting frame 16 covering it from above. In rear of the joint box 38, the fuel cylinder 6 fixed firmly by the supporting frame is positioned to protect the joint box 38 surely. Further, since the front supporting frame 16 is projected from the rear floor 11 high between the seat back 5 and the fuel cylinder 6, the fuel cylinder 6 is separated from the car-room and prevented from moving surely.

What is claimed is:

1. A fuel cylinder mounting structure in a motorcar, said fuel cylinder mounting structure having a fuel cylinder module, comprising:

a fuel cylinder for storing compressed fuel gas;

a supporting frame fixed to said fuel cylinder;

fuel pipes neighboring said fuel cylinder; and a joint box on which said fuel pipes concentrate integrally attached to said supporting frame, wherein said fuel cylinder module is detachably fixed to a car-body side supporting portion provided on a rear floor of said motorcar for supporting said fuel cylinder.

2. A fuel cylinder mounting structure in a motorcar as claimed in claim 1, wherein said car-body side supporting portion is formed by a car-body side supporting frame fixed between right and left wheel housings.

3. A fuel cylinder mounting structure in a motorcar, comprising:

a pair of right and left car-body side supporting frames fixed on a car-body frame between right and left wheel housings within a trunk room and elongated in before-and-behind direction of the car;

a fuel cylinder for storing a compressed fuel gas directed widthwise of the car; and a pair of front and rear cylinder side supporting frames elongated widthwise of the car and fixed to said fuel cylinder so as to pinch said fuel cylinder from before and behind, wherein said cylinder side supporting frames are detachably fixed to said car-body side supporting frames for supporting said fuel cylinder from below, and wherein a joint box on which said fuel pipes concentrate is integrally attached to said front supporting frame.

4. A fuel cylinder mounting structure in a motorcar as claimed in claim 3, wherein an upper surface of said car-body side frame is flat.

5. A fuel cylinder mounting structure in a motorcar, having a fuel cylinder for storing a compressed fuel gas arranged in rear of a rear seat back directed widthwise of the car and supported from below by a front supporting frame and a rear supporting frame pinching said fuel cylinder from before and behind, said front supporting frame being fixed to a body frame and projected high between said rear seat back and said fuel cylinder, fuel pipes being concentrated under said front supporting frame.

* * * * *